United States Patent [19]
Farina

[11] Patent Number: 6,086,079
[45] Date of Patent: Jul. 11, 2000

[54] BICYCLE AND THE LIKE WITH CHAIN TRANSMISSION, MULTIPLE GEARS AND PEDAL UNIT PLACED ON THE OUTSIDE OF THE REAR WHEEL

[76] Inventor: Ernesto Farina, via Salceto snc, 03039 Sora (FR), Italy

[21] Appl. No.: 09/372,155

[22] Filed: Aug. 11, 1999

Related U.S. Application Data

[63] Continuation of application No. 09/051,241, Apr. 6, 1998.

[30] Foreign Application Priority Data

Sep. 5, 1996 [IT] Italy .................................. FR96A0011
Feb. 12, 1997 [IT] Italy .................................. FR97A0003

[51] Int. Cl.$^7$ .................................. B60K 13/00
[52] U.S. Cl. .................... 280/261; 280/288.1; 280/304.4
[58] Field of Search ................................ 280/271, 259, 280/260, 261, 304.4, 288.1, 281.1

[56] References Cited

U.S. PATENT DOCUMENTS

| D. 277,744 | 2/1985 | Traylor ..................................... D12/111 |
| 579,002 | 3/1897 | Merrill ..................................... 280/223 |
| 635,683 | 10/1899 | Herman . |
| 2,929,641 | 3/1960 | Alvistur .................................... 280/261 |
| 4,248,448 | 2/1981 | Dmitrowsky .............................. 280/261 |
| 4,445,701 | 5/1984 | Stroud . |
| 4,456,276 | 6/1984 | Bortolin . |
| 4,981,306 | 1/1991 | Young . |
| 5,403,027 | 4/1995 | Hwang . |

FOREIGN PATENT DOCUMENTS

| 0 285 858 | 10/1988 | European Pat. Off. . |
| 837231 | 2/1939 | France . |
| 1102611 | 10/1955 | France . |
| 2 483 349 | 12/1981 | France . |
| 8614882 | 10/1986 | Germany . |
| 4124292A1 | 3/1992 | Germany . |
| 236146 | 5/1945 | Switzerland . |
| 1 300 566 | 12/1972 | United Kingdom . |

OTHER PUBLICATIONS

Soviet Patent Abstracts, Week 9240, dated Nov. 18, 1992, by Derwent Publications, Ltd., London, which is an abstract of Soviet Patent Publication No. SU 1698123A, published on Dec. 15, 1991.

*Primary Examiner*—Kevin Hurley
*Assistant Examiner*—Lynda Jasmin
*Attorney, Agent, or Firm*—Smith, Gambrell & Russell, LLP

[57] ABSTRACT

An aerodynamic bicycle that reduces intra-abdominal pressure, improves aerodynamic performance, and improves muscular power efficiency includes various structures to support and hold the driver in a lying down, prone position, rather than in a sitting position. The bicycle includes: (a) a front wheel; (b) a rear wheel; (c) a frame connected to the front wheel and the rear wheel; (d) a handlebar for controlling a direction of travel of the bicycle; (e) a seat member supporting a gluteus region of the bicycle driver; (f) a first support member for supporting hips of the driver; (g) a second support member for supporting an axillary or sternal region of the driver; (h) a first, smaller sprocket located at the hub of the rear wheel; (i) a pedal unit including two pedals and a second sprocket located proximate to a circumference of the rear wheel; and (j) a chain connecting the first sprocket and the second sprocket. A top surface of the seat member on which the gluteus region of the driver is supported is arranged at an angle between vertical and horizontal such that the gluteus region of the driver is supported against gravitational forces without placing the driver in a sitting position. A seat guide movably holds the seat member such that it can be adjusted to different heights. The seat member is removably fastened to the seat guide such that these two elements can be rapidly unfastened in the event that the bicycle driver falls.

8 Claims, 4 Drawing Sheets

BICYCLE AND THE LIKE WITH CHAIN TRANSMISSION, MULTIPLE GEARS AND PEDAL UNIT PLACED ON THE OUTSIDE OF THE REAR WHEEL

This application is a continuation of U.S. patent application Ser. No. 09/051,241, filed on Apr. 6, 1998, which application is incorporated entirely herein by reference.

BACKGROUND OF THE INVENTION

This invention concerns a bicycle and the like with a chain transmission, multiple gears, and pedals placed on the outside of the rear wheel. This arrangement improves the function of the cyclist's organs and muscles, and consequently, the cyclist's energy output. Moreover, this invention provides a vehicle with efficient mechanical and aerodynamic characteristics and, last but not least, a vehicle that is nice to look at. The vehicle has been conceived taking into consideration that when a driver is situated in a sitting position, as is typical on a traditional bicycle, he or she is not anatomically positioned so as to realize an optimum functioning of all the organ and muscles which work in order to get a maximum output.

By carefully analyzing the traditional bicycle, we deduced that during the maximum angel-shot of the bust, the intra-abdominal viscera compression, which is due to a reduction of space in the abdominal cavity, increases the abdominal pressure and, consequently, raised the diaphragm. The so-called "Valsalva" phenomenon, which is the increase of the intra-abdominal pressure, hampers the venous return of blood from the limbs, prejudicing the hemodynamic and metabolic functions of the driver. Even an organism in very good health can endure this situation only for a short time without running into serious metabolic repercussions. By analyzing the breathing of an athlete on a traditional bicycle, we can see that raising the diaphragm (a very important breathing muscle) during the maximum bust angle-shot causes reduced pulmonary excursion, with a reduction of oxygenation, of venous and lymphatic return, and consequently, a reduction of the power efficiency. By analyzing the leg musculature and its function on traditional bicycles, we noted that part of the energy produced by the muscles is utilized to push the traction pedal and that, at the same time, it takes a considerable waste of energy to raise the other limb again. Considering the leg muscles and their functions during the pedaling phase, we noted that the traction push on the pedals is due to the M. Femoral Quadriceps, and that all of the remaining leg muscles carry out a very small function of the traction push (they mainly help raise the leg again before another traction push). For all these reasons, the traditional bicycle provides a "non-optimal" distribution of the muscular work of the limbs, thereby wasting a portion of the energy output of the leg muscles.

The advantages of the velocipede I conceived are the following: with this new bicycle, the posterior thigh muscles (Femoral Biceps, M. Half-tendinous, M. Half-membranous, M. Psoas, and partly the long adductor), working without gravitational effort, turn the energy wasted to lift the gravitational weight of the limbs during the pedaling phase into energy of traction. In addition to that, all those leg muscles, which were totally unused with the traditional bicycle, play a considerable role in respect to this new velocipede. They, in fact, optimize the push on the pedals, thanks to the function of foot extension and flexion; the legs' muscular work does not coincide, like it usually does for traditional bicycles, with the dead center of the pedaling phase, and therefore, this new vehicle allows a valid push on the pedals.

In brief, with the vehicle according to the invention, the distribution of the legs' muscular work, with respect to the action of the gravity force, undoubtedly will be more harmonious as compared to a traditional bicycle. This condition will improve the venous and lymphatic circulation thanks to a better muscular pump function, facilitating the driver's cardio-circulatory functions. These are the scientific presuppositions for the improvement that this new vehicle brings to the respiratory, muscular, and cardio-circulation apparatus.

We will now analyze the disadvantageous mechanical aspects of a traditional bicycle: the experts, trying to get the best possible performances with a pedal traction vehicle, have always concentrated their efforts, and they always will, mainly upon improvement of aerodynamic factors. From this point of view, the sitting position is another great weakness of the traditional bicycle.

BRIEF DESCRIPTION OF THE DRAWINGS

The advantageous aspects of the vehicle according to the invention will become more apparent from the following detailed description, particularly when considered in conjunction with the attached drawings, wherein.

DETAILED DESCRIPTION OF THE INVENTION

The figures illustrate, in detail, embodiments of a bicycle according to the invention. On traditional bicycles, it was noted that the roadholding and the stability of the traditional bicycles could be improved considerably. Bearing these considerations in mind, I have been trying to solve all these problems without disregarding any of the details which could be improved, and I have carried out all the innovations I am proposing with the velocipede I have invented. After due consideration, I frankly think it is a first-rate vehicle with an excellent energy efficiency and an extremely pleasant design.

Figure 1:
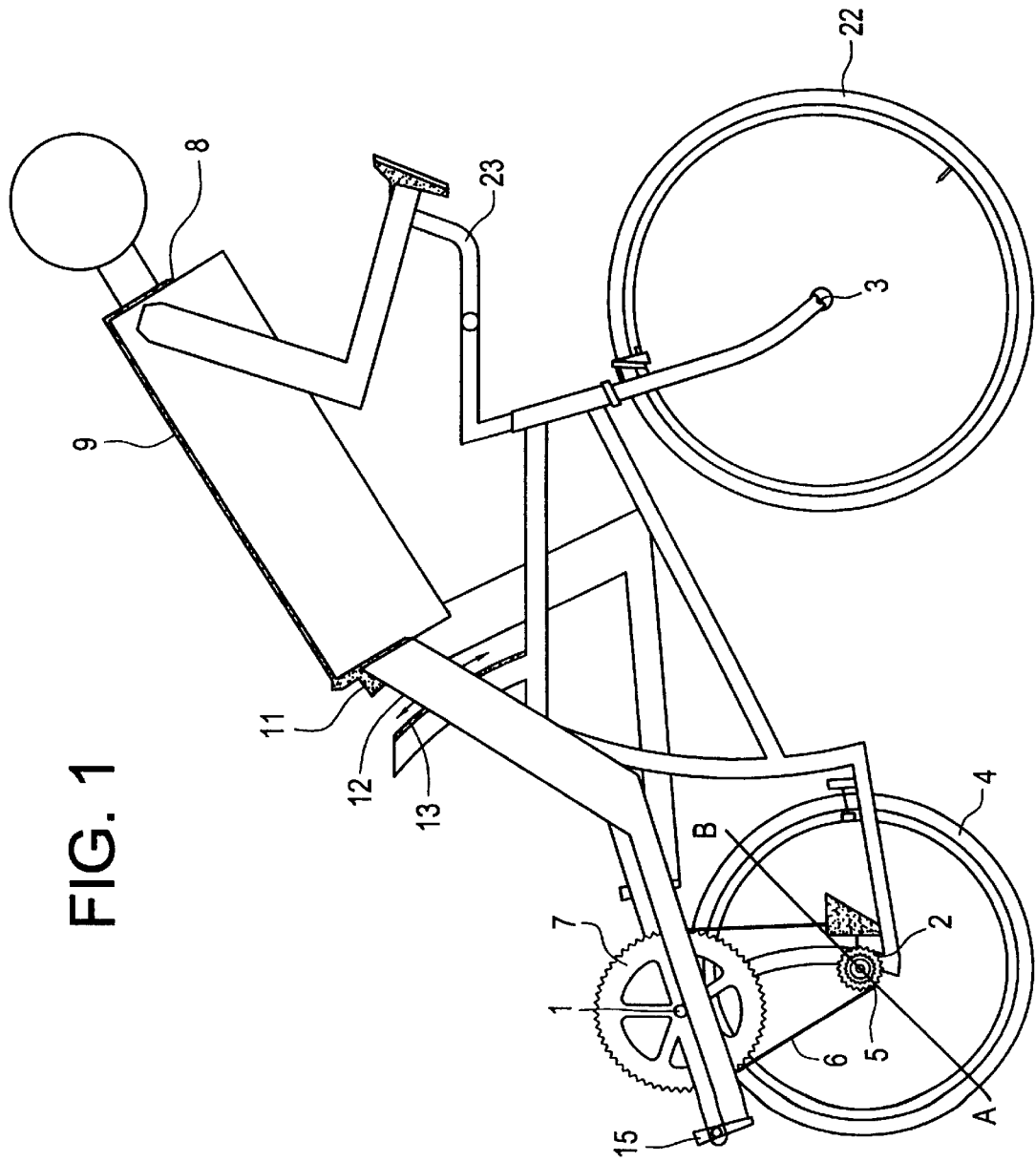
FIG. 1 illustrates an embodiment of a vehicle according to the invention with a driver positioned thereon.

The bicycle according to the invention introduces many important innovations: improved aerodynamic factors, stability, roadholding, and energy output. These innovations certainly make the bicycle of the invention very interesting and totally innovative as a result of all the improvements brought to the obsolete traditional bicycle. By analyzing every single improvement and innovation which has been made, we notice that this velocipede will allow the cyclist to position himself or herself in an extremely aerodynamic position, as shown in FIG. 1. This position, wherein the driver is stretched out with his or her legs stretched backward (i.e., in a lying flat prone position) is the best thing one can do to improve aerodynamic performance. This position induces a minimum aerodynamic impact from both the driver and the means of transport.

The vehicle according to the invention uses smaller wheels 4 and 22 of different diameter, even on the same vehicle, without detrimental effects on its speed. On the contrary, these smaller wheels 4 and 22 will reduce the weight of the vehicle and improve its stability by lowering the center of gravity. Moreover, weight will be equally distributed on both wheels 4 and 22 (a function performed by the balancer shown in FIGS. 2 and 4) with an advantage for roadholding capacity. In addition to that, the vehicle according to the invention allows the driver to pedal even while turning, which results in considerable traction and roadholding capacity. I believe that one of the most important advantages is the aerodynamic one, which, together with the new position of the driver, makes this vehicle the very best improvement that can be made on this old means of transportation.

The innovation was born from the willingness to create a velocipede with high qualitative standards where the driver would be in a condition of maximum physical efficiency and where he or she could take the best aerodynamic position. It was necessary to find a way of supporting the cyclist's mass without compromising the stability of the vehicle and the function of cardio-circulation and breathing. The following solutions were found. The first thing to consider was the driver's position; it had to be changeable and as comfortable as possible in order to avoid tiring out the cyclist (any position, even the most comfortable one, cannot be kept for long). The position is confined: the trunk must be stretched out and the limbs stretched backwards.

Figure 2:
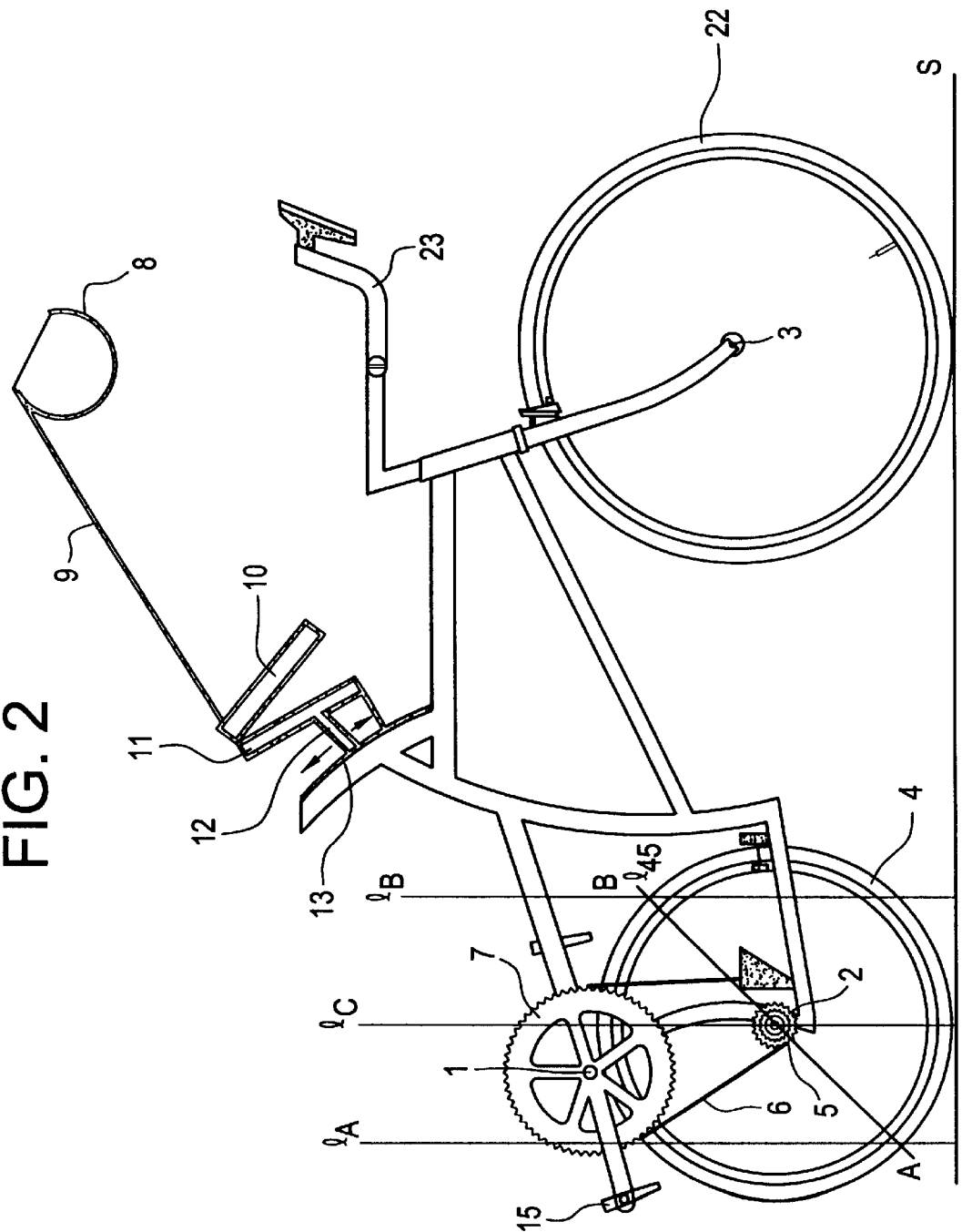
FIG. 2 illustrates a balancer on a vehicle according to the invention in more detail.
Figure 4:
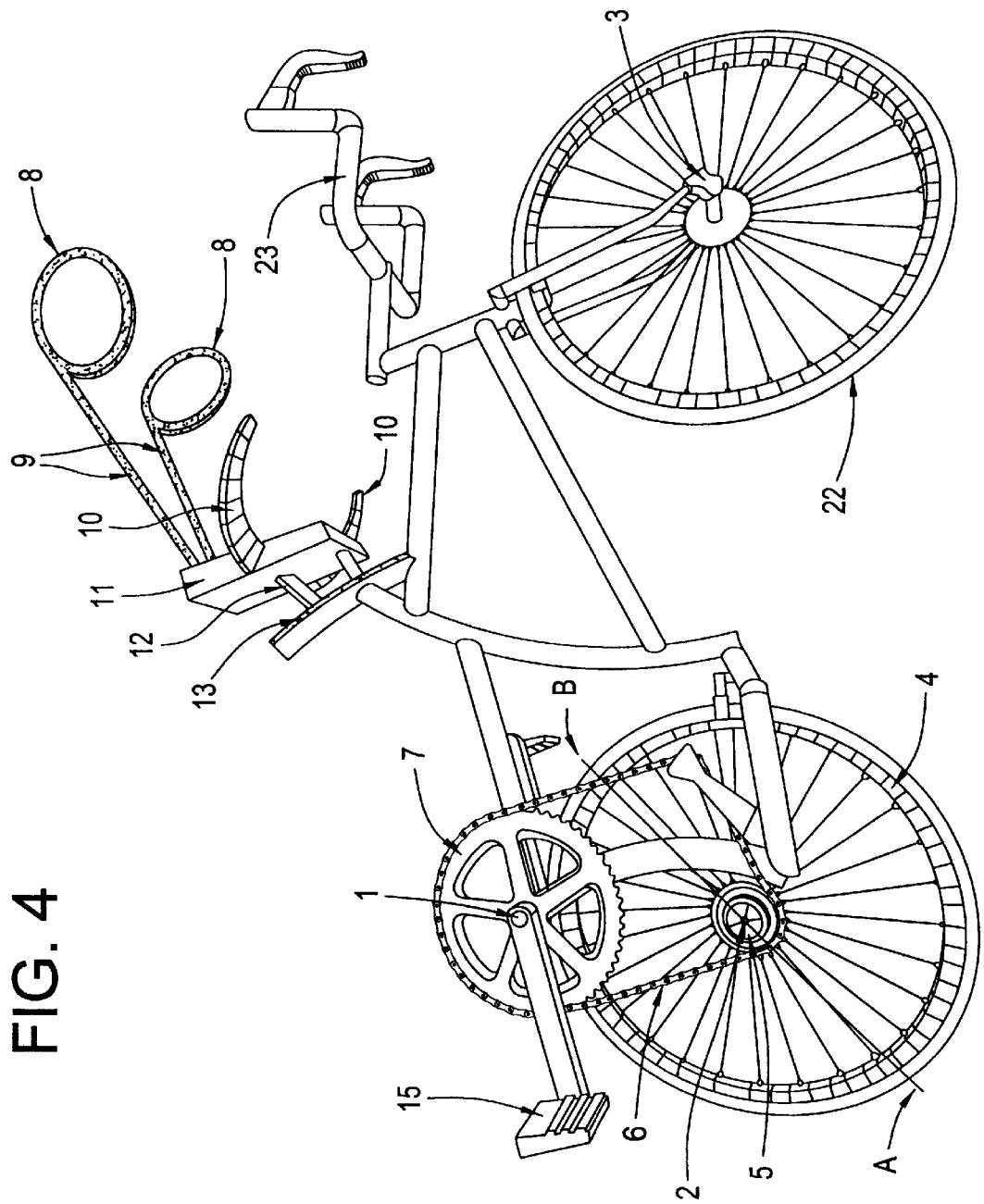
FIG. 4 illustrates another balancer on a vehicle according to the invention.

By analyzing the possible supporting points of the trunk, we noted that the ones which allow the driver to keep breathing easily are: the scapular-humeral articulation (axillary region) and the upper median part of the bust (the sternal and parasternal regions). Setting great store by all I have said, it was possible to create a special track suit called a "bilanciere" (as shown in FIGS. 2 and 4) or a "balancer," with specific support on those points mentioned above. This bilanciere or balancer allows the driver to maintain a very comfortable and stable position: the arms and forearms work solely in order to change the position and get the driver to the most favorable position. Another important support point is at the gluteal region, which is tilted and is always about to glide, especially when the cyclist's trunk is stretched out in order to take the position of maximum muscular power efficiency and aerodynamic performance. To solve this problem, it was necessary to create a new saddle 11. Through the balancer of FIGS. 2 and 4, the gravity force which bears down on the driver's trunk is turned into a push force on the saddle 11 of the new vehicle. This condition will assure a valid support for the pelvis weight, preventing the body from going onward during the shove on the pedals 15.

Additional support has been obtained by creating a special track suit in order to get correct support between the shoulder and the saddle while the driver is taking the maximum aerodynamic position. In this regard, the "Balancer" is able to support the driver's bust exploiting the gravity force. A fastening element 12 with a rapid unhooking characteristic (like the one used for the pedals) fastens the "Balancer" to the velocipede. The special track suit, into which can be vulcanized the balancing apparatus, harmonizes these structures. The balancer is made of a material which efficaciously supports the driver's body and is flexible, light, and practical (it can be made of different materials such as fiberglass and other flexible materials, or compressed air pumped into tubular structures which are part of the track suit). The balancer includes one or more elements 9 positioned on the back of the driver, as shown in FIGS. 1, 2, and 4. Different semi-rigid materials (carbon, fiberglass etc.) work from the gluteus region to the shoulders, comfortably supporting the driver. The structure allows for stable and comfortable driving in any given position. The balancer runs on a special guide 13 going from 80 cm. to 120 cm. above the ground. Even in the most aerodynamic position, when the bust is more or less parallel to the ground, the effect of the track suit, with its flexible traction elements (shoulder-saddle) and concerning supports (the upper part of the bust mainly supported by the axillary supports 8; the lower part of the bust mainly supported by the gluteus and hips, including support element 10), prevents the body from falling down and supports the body in the best way, with the arms free to move without compromising vehicle stability. In brief, the supporting points of the driver are: the legs on the pedals 15; the thighs and gluteus on the anatomical new saddle 11; the thorax and shoulders on the track suit with axillary support(s) 8 (FIGS. 2 and 4) or a corset with anatomical shoulder pads, and support elements 9 and 10; and the arms and forearms on the handlebar 23. As shown in FIGS. 1, 2, and 4, support element 9, including the axillary supports 8, for supporting the axillary and sternal region of the driver, extends forward with respect to the seat or saddle member 11.

Figure 3:
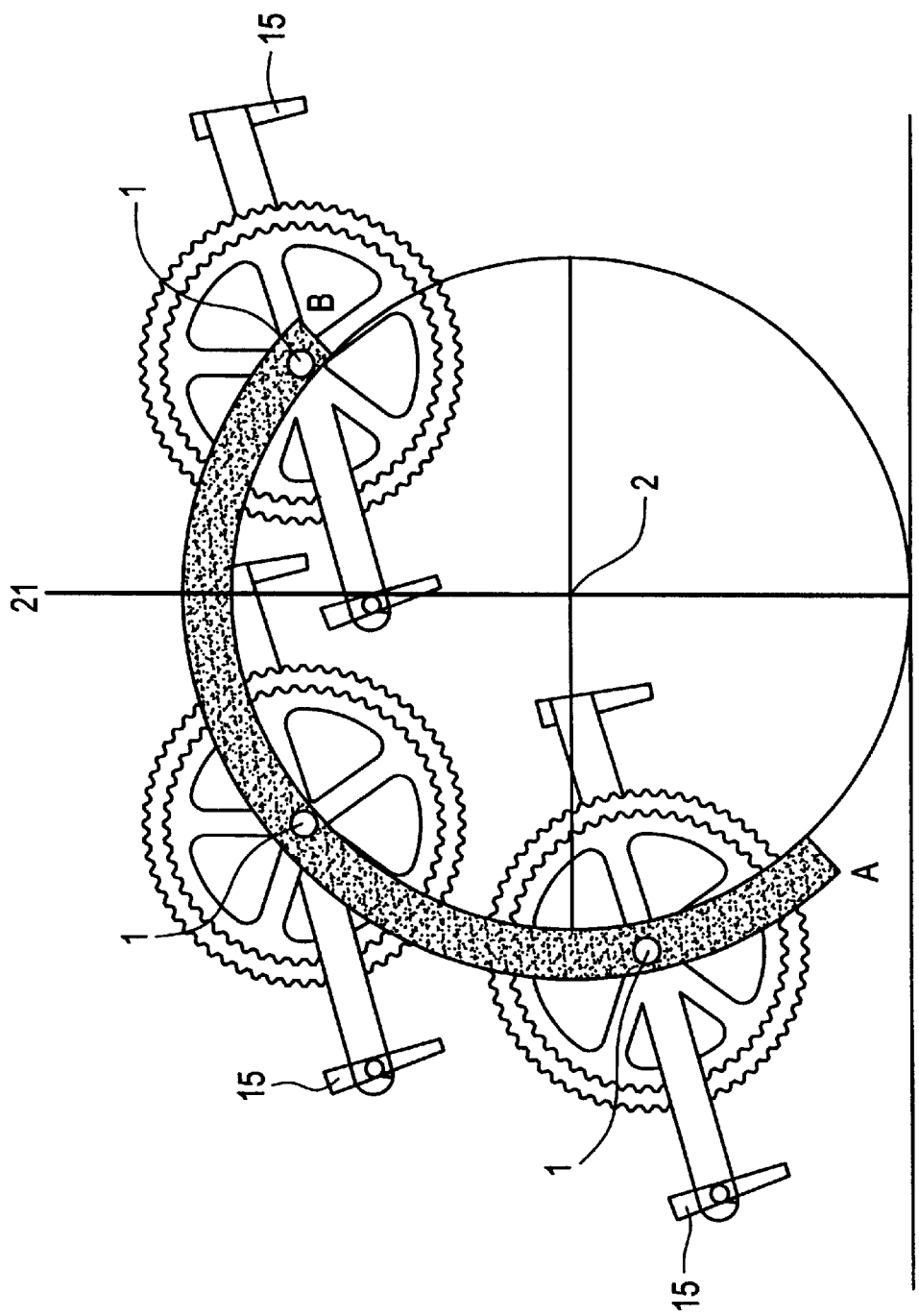
FIG. 3 illustrates the pedal unit of a vehicle according to the invention.

This means of transport according to the invention turns out to be light, stable, and easy to drive without compromising the driver's position and the output of energy. Its characteristics are certainly very interesting. The velocipede is extremely original, light, and fast. Stability is assured by selecting the position of the pedals 15, as shown in FIG. 3, which are always situated close to a line 21 perpendicular to the ground, passing through the hub 2 of the rear wheel 4, which prevents the bicycle from swaying even when pedaling vigorously. The position of the pedal unit, which creates a ground-hub block, guarantees the stability of the bicycle. In brief, in this velocipede, the contact of the rear wheel 4 with the ground is not a point of fulcrum, but a point of resistance to pedal swaying and bicycle direction changing, preventing oscillations during the pedaling phase from being transmitted to the wheels 4 and 22.

The invention originates from the intuition of the new position of the pedals, as shown in FIG. 1, wherein the axis 1 of central movement of the pedal unit is always placed on the outside of the rear wheel 4 at a variable position, within the area bounded by points A and B, as shown in FIG. 3. Points A and B are identified as follows: starting from the Cartesian Axes (abscissa and ordinate) having the hub 2 of the rear wheel 4 as an origin, we divide this wheel 4 into four equal quadrants (two lower quadrants and two upper quadrants or two external quadrants and two internal quadrants). The upper quadrants correspond to the upper 180 degrees of the rear wheel 4 without any direct connection to the ground. The lower quadrants correspond to the lower 180 degrees of the rear wheel 4 with direct connection to the ground. The external quadrants correspond to the outer 180 degrees of the rear wheel 4 without any connection to all of the remaining parts of this vehicle. The internal quadrants correspond to the inner 180 degrees of the rear wheel 4 with direct connection to all the remaining parts of this vehicle. Point A is placed on the external circumference of the rear wheel 4, and we get it by subdividing the lower external quadrant into two equal parts with a straight line passing through the hub 2. Point B is placed on the external circumference of the rear wheel 4, and we get it by subdividing the upper internal quadrant into two equal parts with a straight line $l_C$ passing through the hub 2.

As evident from the above discussion and illustrated in FIG. 2, points A and B are defined by a first intersection and a second intersection of a circumference of the rear wheel 4 with a line $l_{45}$ extending through the hub 2 at an angle of 45° with respect to a line perpendicular to the surface S on which the front wheel 22 and the rear wheel 4 rest (e.g., line $l_C$ through the center hub 2).

The area bounded by points A and B, within which the axis 1 of central movement of the pedal unit is placed, is located outside the rear wheel 4 and between a first line $l_A$, extending perpendicularly from the surface S through point A, and a second line $l_B$, extending perpendicularly from the surface S through point B. It is also evident from the above discussion and FIG. 2 that line $l_{45}$ extends at an angle of 45° to the first line $l_A$ and to the second line $l_B$.

All the mechanical aspects will present advantages due to the position of the pedals 15 and the driver. I assure an advantageous reduction of weight, since the wheelbase (i.e., the distance between hub points 2 and 3) is more or less unchanged compared to traditional vehicles. The reduction of weight in this new bicycle is mainly due to the shorter diameter of both wheels 4 and 22. The compactness of the whole mechanism of transmission (e.g., large sprocket 7, small sprocket 5, and chain 6) contributes to weight reduction. Having wheels with a shorter diameter, especially the rear one 4, this bicycle needs only a very small free gear wheel sprocket 5 (an eight/nine cog wheel when you get into short gears and a twenty-eight/nineteen cog wheel when you get into long ones). When the chain 6 is shorter, this is an additional advantage for reducing the weight of the rotating parts. For example, in one of our first models with a twenty inch rear wheel 4 (147 cm each revolution), we used a 65 cog central large sprocket 7 and an eleven/eighteen cog free gear wheel sprocket 5. With this model, we reached the speed of about 60 K.P.H. on a planar surface (without being professionals).

In brief, the balancing apparatus according to the invention is definitely efficient and allows a comfortable and solid driving position. The bicycle is light, stable, easy to drive, and has a very good roadholding quality. Lastly, we are satisfied with the look of the bicycle, even if this aspect can be improved.

I claim:

1. A bicycle, comprising:

a front wheel rotatably mounted on a first hub;

a rear wheel rotatably mounted on a second hub;

a frame connected to the front wheel and the rear wheel;

a handlebar for turning the front wheel and controlling a direction of travel of the bicycle;

a seat member arranged to support a gluteus region of a driver of the bicycle against gravitational forces;

a first sprocket on a first axis, wherein the first axis passes through the second hub of the rear wheel;

a pedal unit including two pedals and a second sprocket, wherein the second sprocket is rotatably mounted on a second axis parallel with the first axis, wherein the second axis is located:

(a) outside of the rear wheel, and (b) between a first line extending perpendicular from a surface on which the front wheel and the rear wheel rest through a first point, and a second line extending perpendicular from a surface on which the front wheel and the rear wheel rest through a second point, wherein the first point is defined by a first intersection of a circumference of the rear wheel with a line extending through the second hub at an angle of 45° to the first line, and the second point is defined by a second intersection of the circumference of the rear wheel with the line extending through the second hub at an angle of 45° to the first line; and a chain connecting the first sprocket and the second sprocket, wherein the handlebar, the seat member, and the second axis of the pedal unit are arranged such that legs of the driver extend backward from the seat member to the pedal unit and arms of the driver extend forward from the seat member to the handlebar.

2. A bicycle according to claim 1, further including a seat guide for movably holding the seat member such that the seat member is adjustable to different heights above the surface upon which the front wheel and the rear wheel rest.

3. A bicycle according to claim 2, wherein the seat member is removably fastened to the seat guide such that the seat member and the seat guide can be unfastened from one another.

4. A bicycle according to claim 1, wherein a top surface of the seat member supporting the gluteus region of the driver is arranged at an angle between vertical and horizontal such that the gluteus region of the driver is supported without placing the driver in a sitting position.

5. A bicycle according to claim 1, further including a support member, extending forward with respect to the seat member, for supporting hips of the driver.

6. A bicycle according to claim 1, further including a support member, extending forward with respect to the seat member, for supporting an axillary or sternal region of the driver.

7. A bicycle, comprising:

a front wheel rotatably mounted on a first hub;

a rear wheel rotatably mounted on a second hub;

a frame connected to the front wheel and the rear wheel;

a handlebar for turning the front wheel and controlling a direction of travel of the bicycle;

a seat member arranged to support a gluteus region of a driver of the bicycle;

a seat guide for movably holding the seat member such that the seat member can be adjusted to different heights above a surface upon which the front wheel and the rear wheel rest, and wherein the seat member is removably fastened to the seat guide;

a first support member, extending forward with respect to the seat member, for supporting hips of the driver;

a second support member, extending forward with respect to the seat member, for supporting an axillary or sternal region of the driver;

a first sprocket on a first axis, wherein the first axis passes through the second hub of the rear wheel;

a pedal unit including two pedals and a second sprocket, wherein the second sprocket is rotatably mounted on a second axis parallel with the first axis, wherein the second axis is located:

(a) outside of the rear wheel, and (b) between a first line extending perpendicular from the surface on which the front wheel and the rear wheel rest through a first point, and a second line extending perpendicular from the surface on which the front wheel and the rear wheel rest through a second point, wherein the first point is defined by a first intersection of a circumference of the rear wheel with a line extending through the second hub at an angle of 45° to the first line, and the second point is defined by a second intersection of the circumference of the rear wheel with the line extending through the second hub at an angle of 45° to the first line; and a chain connecting the first sprocket and the second sprocket, wherein the handlebar, the seat member, the first support member, the second support member, and the second axis of the pedal unit are arranged such that legs of the driver extend backward from the seat member to the pedal unit and arms of the driver extend forward from the seat member to the handlebar.

8. A bicycle according to claim 7, wherein a top surface of the seat member supporting the gluteus region of the driver is arranged at an angle between vertical and horizontal such that the gluteus region of the driver is supported against gravitational forces without placing the driver in a sitting position.

* * * * *